(12) United States Patent
Suzuki

(10) Patent No.: US 6,256,343 B1
(45) Date of Patent: Jul. 3, 2001

(54) METHOD AND APPARATUS FOR IMAGE CODING

(75) Inventor: Yoshinori Suzuki, Urawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/961,156

(22) Filed: Oct. 30, 1997

(30) Foreign Application Priority Data

Oct. 30, 1996 (JP) ................................................. 8-287932

(51) Int. Cl.[7] ....................................................... H04N 7/18
(52) U.S. Cl. ......................... 375/240; 348/416; 348/415; 348/411; 348/699
(58) Field of Search ................................... 348/416, 415, 348/413, 411, 699, 700, 405, 404; 375/240.16

(56) References Cited

U.S. PATENT DOCUMENTS

| | | | |
|---|---|---|---|
| 5,235,419 | * | 8/1993 | Krause ................................. 348/416 |
| 5,473,379 | * | 12/1995 | Horne .................................. 348/416 |
| 5,510,834 | * | 4/1996 | Weiss et al. .......................... 348/699 |
| 5,592,228 | * | 1/1997 | Dachiku et al. ...................... 348/416 |
| 5,657,087 | * | 8/1997 | Jeong et al. .......................... 348/416 |
| 5,790,206 | * | 8/1998 | Ju ......................................... 348/699 |
| 5,812,197 | * | 9/1998 | Chan et al. ........................... 348/416 |
| 6,008,852 | * | 12/1999 | Nakaya ................................. 348/416 |

OTHER PUBLICATIONS

The Transaction of the Insititute of Electronics; Information and Communications Engineers. B–1 vol. 1 J76–B–1 No. 12, "Global Motion Compensation Method in Video . . . ", pp. 944–952, 1993.*

* cited by examiner

Primary Examiner—Andy Rao
(74) Attorney, Agent, or Firm—Antonelli, Terry, Stout & Kraus, LLP

(57) ABSTRACT

In an image coding such as the international standard H.263, when a motion compensated predictive error signal is orthogonal transformed, derived transform coefficients are quantized and coded, and a motion vector is coded, in order to be liable to detect a motion vector having a small amount of information, estimation is performed by subtracting a predetermined value from a fundamental evaluation value used for motion estimation only in case of a specific motion vector, it is set by a quantizing characteristic parameter for determining a quantizing step width when the transform coefficients are quantized so that the narrower the quantizing step width is, the smaller a difference value subtracted from the appreciation value is. Deterioration in prediction characteristic can be prevented and the amount of coding information of the motion vector accompanying the motion compensating method can be controlled in consideration of the whole coding information.

16 Claims, 7 Drawing Sheets

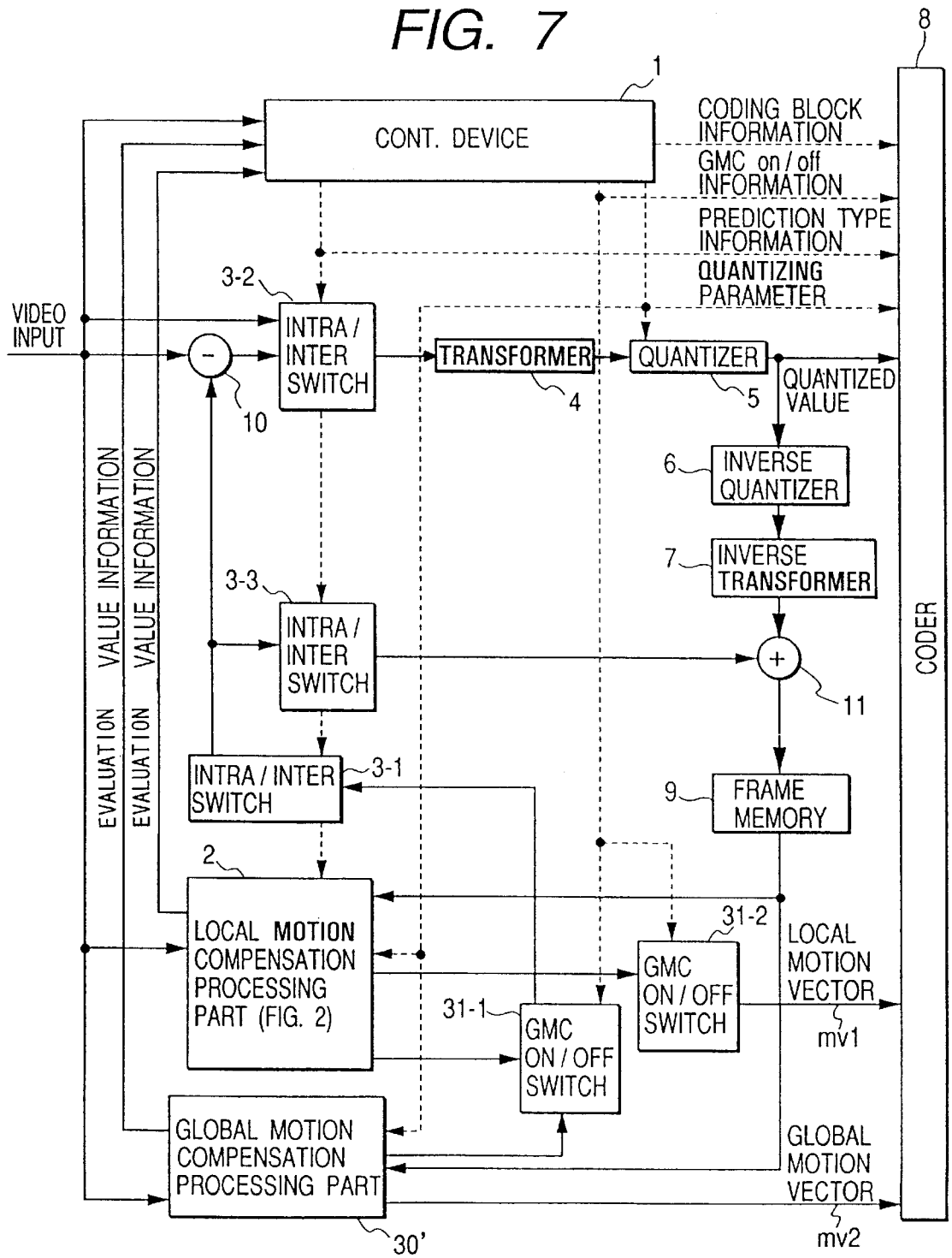

METHOD AND APPARATUS FOR IMAGE CODING

BACKGROUND OF THE INVENTION

The present invention relates to a method and an apparatus for coding picture signals and, more particularly, to a method and an apparatus for high efficiently coding picture signals including a moving picture by using the correlation between temporally neighboring frames.

With respect to the high efficiency coding of picture signals using the correlation between temporally neighboring frames, a change amount of picture signals between temporally neighboring frames, that is, a predictive error, is coded. Change in the picture occurs mostly by motion such as translation, rotation, zoom, transformation, or the like of an image. Data compression techniques using motion compensation in which the amount of motion, that is, a motion vector, is detected and a coding data amount of a picture to be transferred or stored up is reduced by using the motion vector are known.

One of the data compression techniques using the motion compensation is adopted in the international standards H.263, MPEG1, MPEG2, and the like, in which a current picture (current frame) to be coded is divided into a number of blocks, each block is compared with a picture of a previous frame (that is, a reference picture), and a motion vector of the current the block from the reference picture is obtained by block matching. The difference between the motion compensated picture of the previous frame and the current frame, that is, a predictive error signal, is coded by using the obtained motion vector. The predictive error signal is subjected to orthogonal transformation such as DCT on the block unit basis, transform coefficients obtained by the orthogonal transformation are quantized, and the quantized signals are coded using the variable length code. Some codes obtained by variable length coding and some codes obtained by coding the motion vector are multiplexed, and the multiplexed codes are transferred or stored up.

The international standards H.263, MPEG1, and MPEG2 are described in, for example, "Latest MPEG textbook" supervised by Hiroshi Fujiwara (1994.8). In the motion compensation performed by the H.263 coding, a picture frame is divided into sub blocks each consisting of (16 pixels×16 pixels), the sub block is further divided into four blocks each consisting of (8 pixels×8 pixels), the motion vector of the sub blocks or the four small blocks is/are obtained, and picture data and the motion vector of each block are coded.

According to another data compression technique using the motion compensation, a global motion such as rotation, zoom, transformation, and the like in a whole picture occurring by panning of a camera or a zooming operation for sports broadcast or the like is detected and is used for the image coding. The above technique is called a global motion compensation method. There are some methods of global motion compensation (for example, "Global motion compensation method for video coding", by Kamikura et al., The Transaction of the Institute of Electronics; Information and Communication Engineers, Vol. J76-B-1, No. 12, pp944–952, refer to hei5-12). For example, as will be described hereinafter with reference to FIG. 5, generally, motion vectors with respect to pixels at four corners of a picture are obtained and transferred. When the whole original picture is used as one area (patch) 503, and the motion and transformation from the current frame picture 501 to a reference picture 502 is compensated by using the area (patch) 503, the reference picture 502 is transformed as shown by 508. By the motion compensation, grid points 504, 505, 506, and 507 are moved to grid points 509, 510, 511, and 512, respectively, and each grid point holds the motion vector accompanying the motion amount. Consequently, when the four motion vectors are transferred to the decoding side, the global motion compensated picture which is commonly used on both of the coding and decoding sides can be formed. In a method of forming the global motion compensated picture, a high speed algorithm as disclosed in the Official Gazette of Japanese Patent Application Laid-Open No. 8-60572 also exists.

The four motion vectors are not necessarily specified to the pixel positions if there is some agreement between the coding and decoding sides. When the motion vector of a pixel located at the end of the global motion compensated picture exceeds a search range, the global motion compensated picture cannot be completely reformed on the decoding side. In the case where the motion vector of the picture is located out of the picture, the pixel at the corner of the picture is substituted for it.

The global motion compensation is effective as long as the motion in the whole picture is uniformly the same. However, when an area of different motion exists in the picture, the global motion compensation can correspond to the motion of only one of patterns. Consequently, in order to compensate a spatial motion amount existing between the original picture and a global motion compensated picture, a method of performing a local motion compensation by using the global motion compensated picture as a reference picture is also used. Further, in order to correspond to a stationary area or a conventional simple translation as well, there is also an adapting method on the block unit basis by performing the local motion compensation to a picture which is not global motion compensated and to a global motion compensated picture, respectively.

In the above-mentioned picture coding methods executing the motion compensation, in order to easily detect the motion vector which can be reduced the number of coding bits, evaluation is performed by subtracting a predetermined fixed value from a fundamental evaluation value used for the motion estimation (value for evaluating the similarity between a block to be coded and a reference picture block) only in the case of a specific motion vector. This technique of reducing the amount of the motion vector information by subtracting the predetermined fixed value from the fundamental evaluation value used for the motion estimation is effective when the ratio of an amount of the motion vector is large for the ratio of an amount of the whole coding information. However, when the technique is used for a case where the ratio of the amount of the motion vector information is much smaller than the ratio of the amount of the coding information for the error signals, there is the possibility that the increased amount of the coding information of the signals becomes larger than the reduced amount of the coding information of the motion vector and the coding efficiency deteriorates as a result. It also involves deterioration of the performance of the motion compensation.

SUMMARY OF THE INVENTION

It is a main object of the invention to realize a coding method and apparatus for the image coding accompanying motion compensation with high coding efficiency.

It is another object of the invention to reduce the amount of coding information of a motion vector while suppressing an increase in the amount of coding information of an error signal and deterioration in performance of motion compensation in coding of picture signals accompanying local motion compensation and global motion compensation.

In order to achieve the objects, in the image coding method accompanying the motion compensation according to the invention, the error signal as a difference between a picture of a current frame and a motion compensated reference picture (previous frame) is subjected to orthogonal transformation such as DCT, and a subtracting value (positive integer) which is subtracted from a fundamental evaluation value of block matching for obtaining a motion vector is controlled by a quantizing parameter for determining a quantizing step width when the orthogonal transform coefficients are quantized. A plurality of values are used as the subtracting values to be subtracted in accordance with the value of a quantizing parameter which becomes small as an average quantizing step width is narrowed. The subtracting value corresponding to the larger quantizing parameter is set to be larger than the subtracting value corresponding to the smaller quantizing parameter.

An image coding apparatus performing motion compensation according to the invention includes: a local motion compensation processing part for receiving a current frame to be coded and the previous frame (reference picture), obtaining a motion vector of a picture of every block obtained by dividing the current frame into a plurality of blocks, and forming a block predicted picture which is motion compensated by the motion vector; a transforming part for orthogonal transformation a predictive error signal as a difference between the current frame block and the predicted picture block image and adding these transform coefficients to a quantizer controlled by a quantizing parameter; and a coder for coding the motion vector and quantized transform coefficients as an output of the quantizer. In the apparatus, means for controlling a motion estimation part for obtaining a motion vector in the local motion compensation processing part with the quantizing parameter is provided. Especially, for the control of the local motion compensation processing part by the quantizing parameter, a transforming part for transforming the quantizing parameter to a first integer n is provided. When a candidate motion vector is zero (that is, the horizontal and vertical components of the candidate motion vector are zero), the motion estimation part uses a value obtained by subtracting the first integer n from the sum of absolute-value or the sum of square-value of the predictive error signals (simply called a fundamental evaluation value) in a block as an evaluation value. The quantizing parameter is set so that the smaller the parameter is, the narrower the quantizing step width is. A plurality of values are used as the quantizing parameters. With respect to two values as the first integer n allocated to two different quantizing parameters, the first integer n allocated to the smaller quantizing parameter is smaller than the first integer n allocated to the larger quantizing parameter.

When the candidate motion vector in the motion compensation is not zero, a second constant m can be either subtracted or not subtracted from the sum of absolute-value or the sum of square-value of the predictive error signals (fundamental evaluation value). According to a preferred embodiment, when the integer m of the second constant is subtracted, the integer m of the second constant is set to be smaller than the first integer n.

As a preferred embodiment of the invention, the local motion compensation of the above-mentioned invention is performed to a global motion compensated picture which is regarded as a new reference picture, and a coding process is performed.

According to the invention, attention is paid to the fact that the quantizing parameter (although it is called "QUANT" in the description of the international standard H.263, it is abbreviated as "QP" hereinbelow) when DCT coefficients are quantized is concerned with a amount of coding information for the predictive error signal, that is, as the quantizing parameter QP becomes small, the quantizing step width is narrowed, so that the amount of the coding information increases. For example, in a coding system of the H.263, as will be described with reference to the expression (1) in an embodiment, the smaller the quantizing parameter is, the narrower the quantizing step width is. Therefore, it will be obviously understood that the larger the quantizing parameter is, the smaller the amount of information required for coding the DCT coefficients is. Accordingly, it is also obviously understood that as the quantizing parameter becomes larger, the coding amount of the motion vector information for the whole coding amount increases. According to the invention, the subtracting value for the motion 0 vector at the time of the motion estimation, the evaluation value of the INTER mode for the INTER4V mode, and the like is set to be small when the quantizing parameter is small and is set to be large when the quantizing parameter is large, thereby realizing the reduction in the amount of coding information of the DCT coefficients without deteriorating the performance of the motion compensation.

BRIEF DESCRIPTION OF DRAWINGS

FIG. 7 is a block diagram showing the construction of another embodiment of the image coding apparatus according to the invention.

DESCRIPTION OF THE EMBODIMENTS

Figure 1:
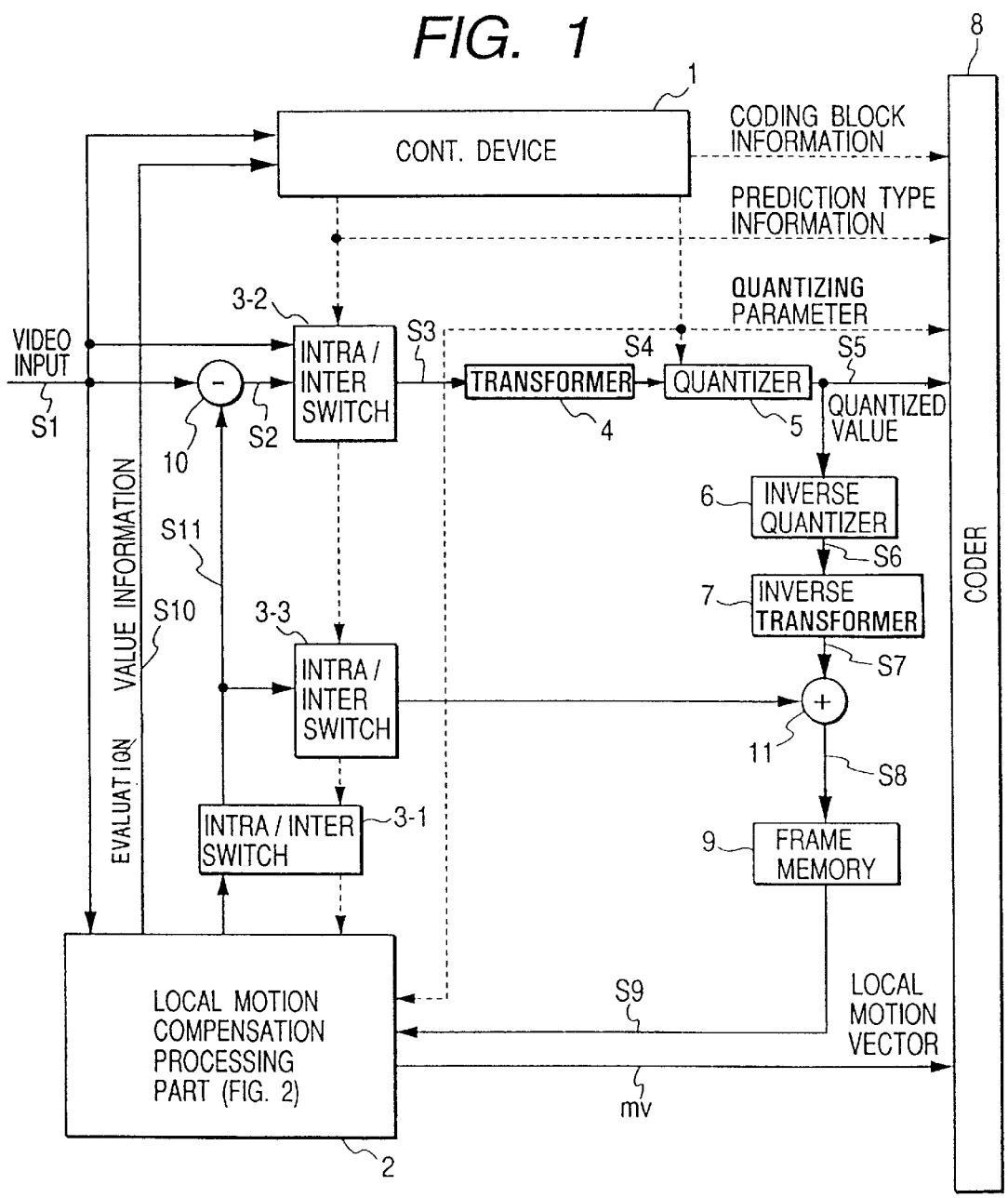
FIG. 1 is a block diagram showing the construction of an embodiment of a picture coding apparatus according to the invention.

FIG. 1 is a block diagram showing the construction of an embodiment of the image coding apparatus according to the invention. In the diagram, components except for a local motion compensation processing part 2 and a control device 1 are substantially the same as those in a conventionally known apparatus.

In the embodiment, coding of a P-picture in which a motion vector is detected and the motion is compensated by using only a coded frame at display order as a reference picture in the H.263 coding will be described. The algorithm coded by international standard H.263 is described in "DRAFT ITU-T Recommendation H.263 (1995.12.5)"

An input picture s1 of a block obtained by dividing the current frame into a plurality of blocks is inputted to the local motion compensation processing part 2. The local motion compensation processing part 2 detects a local motion vector mv between a reference picture s9 from a frame memory 9 and the input picture s1 and performs a local motion compensation to each macro block, thereby obtaining a local motion compensated picture (also called a prediction picture) s11. The local motion vector mv accompanying prediction of each macro block is outputted to a coder 8. The local motion compensated picture s11 is sent to an INTRA/INTER switch 3-1 and a part of it is supplied to a subtracter 10 and the other part is supplied to an adder 11 via an INTRA/INTER switch 3-3. The details of the local motion compensation processing part 2 will be described hereinafter with reference to FIG. 2.

Figure 3:
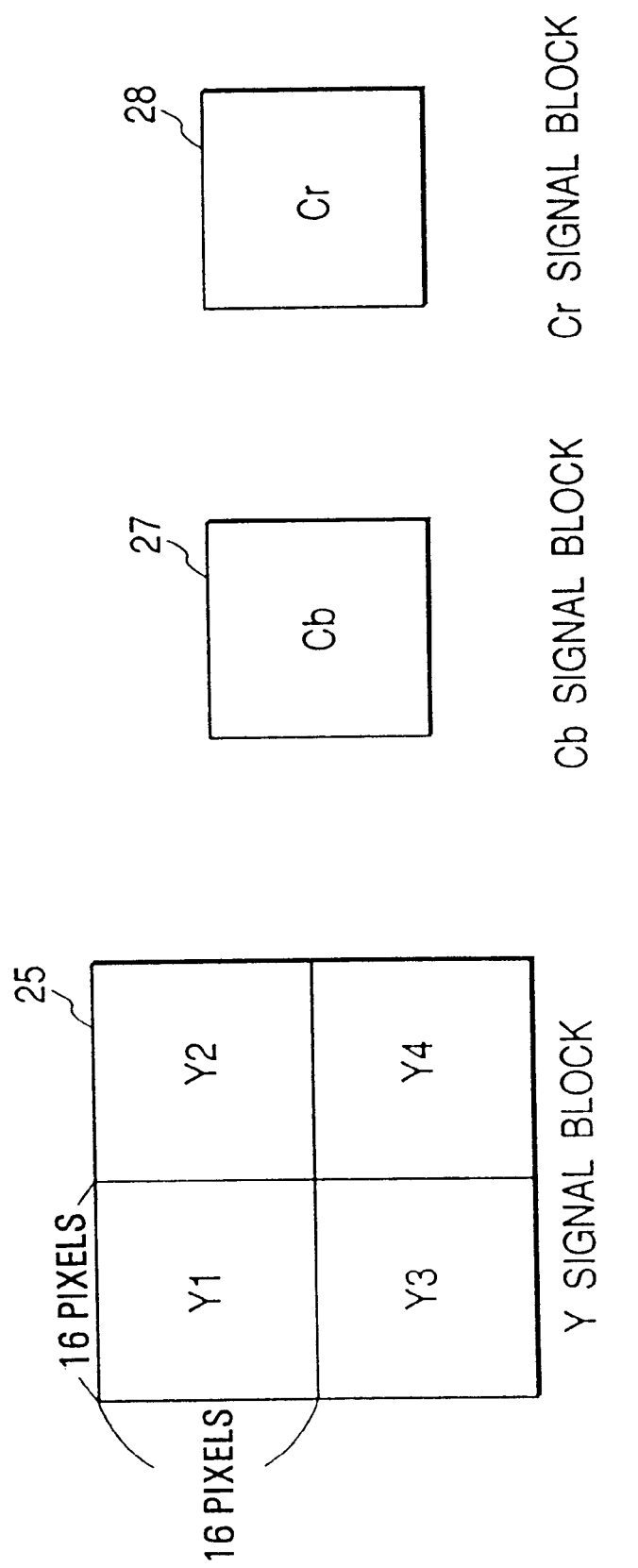
FIG. 3 is a diagram showing the construction of a macro block.

As shown in FIG. 3, the macro block is constructed by a Y signal block 25 consisting of (16 pixels×16 pixels) and two color difference signal blocks Cb and Cr each consisting of (8 pixels×8 pixels), which spatially correspond to the Y signal block 25. The Y signal block 25 is constructed by four blocks Y1, Y2, Y3, and Y4 each consisting of (8 pixels×8 pixels). According to H.263, the coding is performed by performing a discrete cosine transformation (DCT) to the predictive error signal and quantizing DCT transformation coefficients derived as the result of the DCT. The DCT is performed on the unit basis of the blocks Y1, Y2, Y3, Y4, Cb and Cr each consisting of (8 pixels×8 pixels). There are three kinds of prediction types in H.263. The prediction type is selected on the macroblock unit basis. The three kinds of prediction type modes are specifically described as follows.

P-1. INTRA mode for directly performing the DCT to pixels in the block without executing the motion compensation.

P-2. INTER mode for performing the motion compensation to the (16 pixels×16 pixels) block and coding one motion vector.

P-3 INTER4V mode for dividing a block of (16 pixels×16 pixels) into four small blocks each consisting of (8 pixels×8 pixels), performing the motion compensation to each small block, and coding four motion vectors.

Referring again to FIG. 1, each of the INTRA/INTER switches 3-1, 3-2, and 3-3 is controlled so as to select either the mode P-1, P-2, or P-3 of the prediction type according to a control signal from the control device 1 which controls the coding of block, predicting, quantizing, and so on. The input picture s1 and a predictive error signal s2 as an output of the subtracter 10 are supplied via the INTRA/INTER switch 3-2 to a transformer 4 and are subjected to the DCT. Transform coefficients s4 of the macroblocks generated by the transformer 4 are quantized by a quantizer 5 according to a quantizing parameter QP selected from required conditions (coding rate, decoding picture quality, and the like) by the control device 1. The quantizing characteristics parameter QP is a positive integer ranging from 1 to 31 and is set so that the smaller the value is, the narrower the average value of a quantizing step width is. The transform coefficients s4 are expressed by COF and quantized as follows.

$$LEVEL = COF \mathbin{/\mkern-6mu/} 8, \qquad (\text{INTRA DC}) \qquad (1)$$

$$LEVEL = |COF|/(2 \times QP), \qquad (\text{INTER AC})$$

$$LEVEL = (|COF| - QP/2)/(2 \times QP), \qquad (\text{INTER})$$

LEVEL denotes a quantized value, DC denotes a DC component of the transform coefficient, and AC shows an AC component. The operator '/' shows omission of decimals and the operator '//' shows rounding of a fractional value to the nearest integer.

A quantized value s5 as an output of the quantizer 5 is supplied to the coder 8 and a part of the quantized value 5 is supplied to an inverse quantizer 6 and is inverse quantized. The DC component in the INTRA mode among the quantized value LEVEL is dequantized as follows.

$$DCOF = LEVEL \times 8 \qquad (2)$$

The quantized values in the INTER modes are dequantized as follows.

$$|DCOF| = 0 \qquad (LEVEL = 0) \qquad (3)$$

$$|DCOF| = 2 \times QP \times LEVEL + QP, \qquad (LEVEL \neq 0, QP \in \text{odd})$$

$$|DCOF| = 2 \times QP \times LEVEL + QP - 1, \qquad (LEVEL \neq 0, QP \in \text{even})$$

and absolute values are resulted.

$$DCOF \begin{aligned} &= |DCOF|, & (DCOF \geq 0) \\ &= -|DCOF|, & (DCOF < 0) \end{aligned} \qquad (4)$$

The absolute value is added with the positive or negative sign. DCOF denotes a dequantized value. An inverse quantized value s6 derived is subjected to an inverse DCT by an inverse transformer 7. An inversely transformed value s7 is composited with the local motion compensated picture s11 in accordance with the result of the selection of the INTRA/INTER switch 3-3 controlled by the control device 1. After that, the composited value is inputted to the frame memory 9. In the coder 8, in addition to coding block information (indicating which block has information to be coded) every macroblock determined by the control device, prediction type information (the forgoing modes P-1, P-2, P-3), and the quantizing parameter QP, the quantized value s5 and the local motion vector mv are coded and multiplexed.

Figure 2:
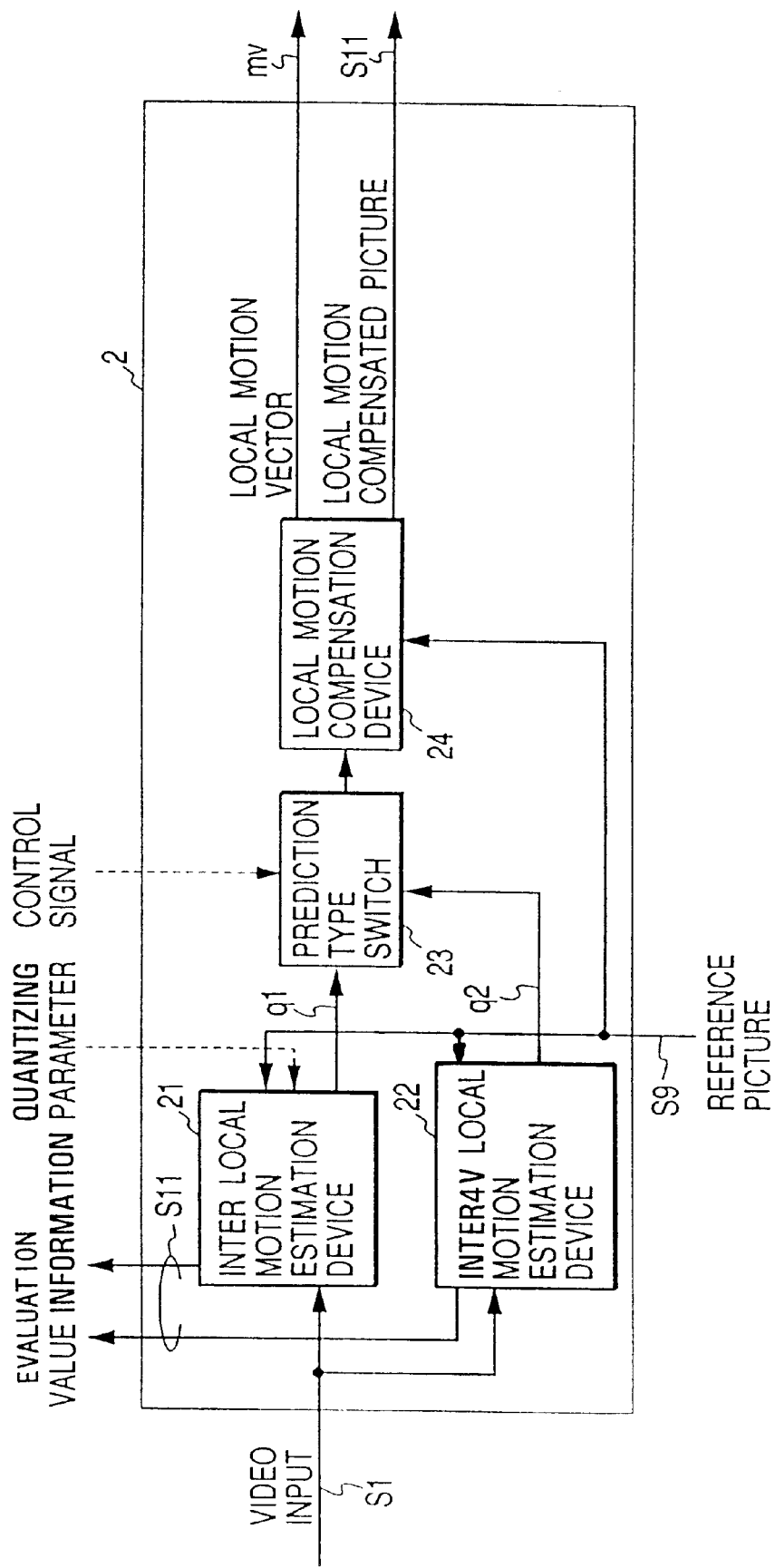
FIG. 2 is a diagram showing the construction of a local motion compensation processing part in FIG. 1.

FIG. 2 is a block diagram showing the construction of the local motion compensation processing part 2. The input picture signal s1 is supplied to both of an INTER local motion estimation device 21 and an INTER4V local motion estimation device 22. The motion estimation devices 21 and 22 performs local motion estimation q1 in the INTER mode and local motion estimation q2 in the INTER4V mode (a (16×16) block is divided into small blocks 1 to 4 in FIG. 3 and the motion estimation is performed every small block) between the input picture s1 and the reference picture s9 taken out from the frame memory 9, respectively. When the current frame is divided into a plurality of macroblocks ($1 \leq i \leq a$), the following calculation is performed every macroblock to a plurality of candidate motion vectors in the search range by the INTER local motion estimation device 21.

$$E_i(u,v) \begin{cases} = \sum_{x=X_i}^{X_i+15} \sum_{y=Y_i}^{Y_i+15} |F(x,y) - R(x-u, y-v)| - n, & (u = v = 0) \\ = \sum_{x=X_i}^{X_i+15} \sum_{y=Y_i}^{Y_i+15} |F(x,y) - R(x-u, y-v)| - m, & (u \neq 0 \text{ or } v \neq 0) \\ (x,y) \in B_i(X_i \leq x < X_i + 16, Y_i \leq y < Y_i + 16), (u,v) \in A_i \end{cases} \qquad (5)$$

The following calculation is performed every macroblock to the plurality of candidate motion vectors in the search range by the INTER4V local motion estimation device 22.

$$4E_{i,j}(u_j, v_j | 1 \le j \le 4) = \sum_{j=1}^{4} \sum_{x=X_{i,j}}^{X_{i,j}+7} \sum_{y=Y_{i,j}}^{Y_{i,j}+7} |F(x, y) - R(x - u_j, y - v_j)|, \quad (6)$$

$$(x, y) \in B_{i,j}(X_{i,j} \le x < X_{i,j} + 8, Y_{i,j} \le y < Y_{i,j} + 8),$$

$$B_{i,j} \in B_i, (u_j, v_j) \in A_{i,j}$$

Consequently, the local motion vector mv in which Ei(u, v) is the minimum and the local motion vector mv in which $4E_{i,j}(u_j,v_j|1 \le j \le 4)$ is the minimum are detected, respectively. The symbols used in the expressions (5) and (6) are as follows.

F(x,y): Amplitude of the Y signal of a pixel in the original picture of a frame to be coded (current frame). x, y are integers showing the coordinates of the pixel.

R(x,y): Amplitude of the Y signal of a pixel in the reference picture s9 (decoded picture of a frame temporally neighboring F, which has been coded already) taken out from the frame memory 9. x, y are integers showing the coordinates of the pixel.

Ei(u,v): Evaluation value for the local motion vector (u,v) of the i(th) block when the picture F is divided into (a) 16×16 blocks.

$4E_{i,j}(u_j,v_j|1 \le j \le 4)$: Evaluation value for candidate local motion vectors (u1,v1), (u2,v2), (u3,v3), (u4,v4) of four 8×8 blocks in the i(th) block when the picture F is divided into (a) 16×16 blocks.

Bi: Pixels included in the (i)th block when the picture F is divided into (a) 16×16 blocks. Each pixel belongs to the range of Xi≤x<Xi+16 or Yi≤y<Yi+16 (x, y are integers). (Xi,Yi) shows a pixel at the left top corner of the block i.

Bi,j: Pixels included in the (j)th block when the block i is divided into four 8×8 blocks. j is an integer from 1 to 4 and corresponds to each of the Y signal blocks 1 to 4 in FIG. 3. Each pixel belongs to a range of Xi,j≤x<Xi,j+8 or Yi,j≤y<Yi,j+8 (x,y are integers). (Xi,j, Yi,j) shows a pixel at the left top corner of the (j)th 8×8 block in the block i.

Ai: Local motion vector in the motion search range of the (i)th 16×16 block. The pixel accuracy is set to the half pixel, and each of the components u, v in the horizontal and vertical components has a real number limited to a value on a 0.5 unit basis.

Ai,j: Local motion vector in the search range of the (j)th 8×8 block in the (i)th 16×16 block. j is an integer from 1 to 4 and corresponds to each of the Y signal blocks Y1 to Y4 in FIG. 3. Each of the components uj,vj in the horizontal and vertical components has a real value limited to a value on a 0.5 unit basis. n and m are integers set by the quantizing parameter.

The minimum evaluation value Ei of the local motion estimation in the INTER mode and the minimum evaluation value $4E_{i,j}$ of the local motion estimation in the INTER4V mode are sent as evaluation value information s10 to the control device 1. The control device 1 compares the two minimum values. When the minimum value of Ei is smaller than or same as the minimum value of $4E_{i,j}$, the INTER mode is selected as a motion prediction type for the macroblock i. When the minimum of $4E_{i,j}$ is smaller than the minimum of Ei, the INTER4V mode is selected as a motion prediction type for the macroblock i. Further, the control device 1 executes INTRA/INTER decision of selecting either the INTRA mode or the INTER mode on the basis of the activity of the input picture and the evaluation value information s10.

The control device 1 controls the prediction type switch 23 according to the result of the INTRA/INTER decision and the local motion vector mv is outputted according to the prediction type selected by the prediction type switch 23 to the local motion compensation device 24. In the local motion compensation device 24, the reference picture s9 from the frame memory 9 as a target is compensated by the local motion vector of each macroblock, and a motion prediction picture, that is, a motion compensated picture s11, is generated. The motion compensated picture s11 is outputted to the INTER/INTRA switch 3-1. The local motion vector mv is outputted to the coder 8.

In the INTER local motion estimation device 21 in FIG. 2, the sum of absolute-value of the predictive error signals is used as a fundamental evaluation value at the time of the motion estimation as shown in the expression (5). When the motion vector is 0, a predetermined integer value n is subtracted from the fundamental evaluation value, and when the motion vector is not 0, a predetermined integer value m is subtracted from the fundamental evaluation value so that specific motion having a small amount of coding information of the motion vector is preferentially detected. This intends to suppress the amount of coding information of the motion vector by permitting slight increase in the amount of coding information in the predictive error signal. Means for generating the integer values n, m is constructed by means for converting a simple table receiving the quantizing parameter and generating the integer values n, m or a circuit executing an arithmetic operation as shown below.

More specifically, the integer values n and m are controlled by the quantizing parameter QP and satisfy the following relation with respect to all of the quantizing parameters QP.

$$0 \le m \le n$$

When the integer m is larger than n, the motion vector having a large amount of coding information of the motion vector is preferentially detected. Consequently, the amount of coding information of the motion vector increases and the amount of coding information of the DCT coefficients also increases.

As an example of the integers n and m, m is fixed to 129 and n is set according to the expression (7).

$$n=129+(QP-20)\times3+m \ (m=129) \quad (7)$$

In this case, when QP=1, n=201. When QP=20, n=258. When QP=31, n=291. This case is compared with a case where n is fixed. When the quantizing parameter QP is larger than 20, there is a tendency that 0 vector is liable to be selected. When the QP is smaller than 20, there is a tendency that 0 vector is not liable to be selected. Since fine quantization is performed when the quantizing parameter QP is small, the above operation matches a tendency that the reduction effect of the amount of motion vector information is canceled by the increased amount of the coding information of the DCT coefficient. When the quantizing parameter QP is large, since the quantization is coarsely executed, the increase in the amount of the coding information of the DCT coefficient due to the slight increase in the error signal is permitted by the quantization, and the amount of the motion vector information can be reduced.

Figure 4:
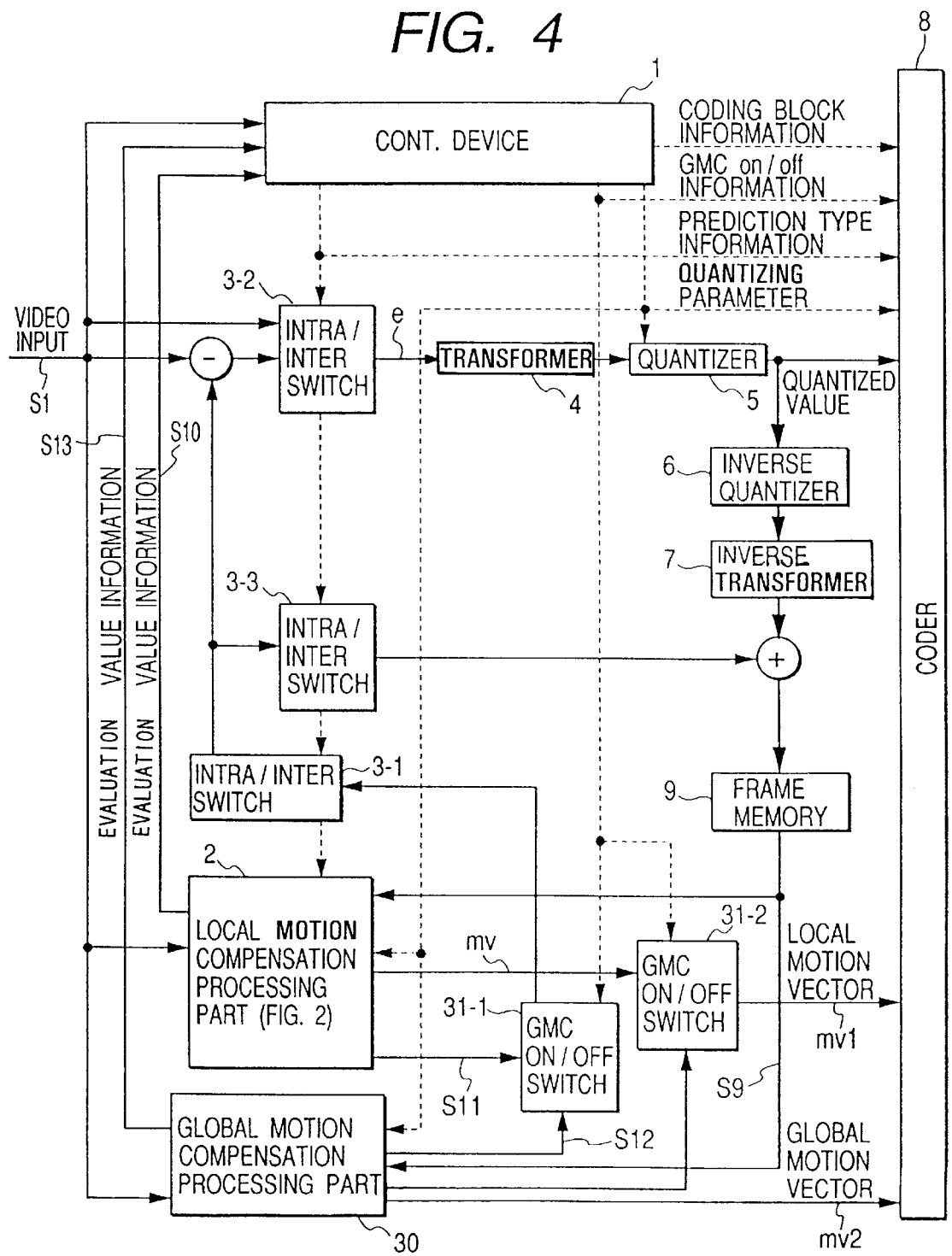
FIG. 4 is a block diagram showing the construction of another embodiment of the picture coding apparatus according to the invention.

FIG. 4 is a block diagram showing the construction of another embodiment of the image coding apparatus according to the invention. In the embodiment, a global motion compensation processing part 30 is added to the construction of the embodiment of FIG. 1. The input picture s1 is supplied to both of the local motion compensation processing part 2 and the global motion compensation processing part 30. Since this local motion compensation processing part 2 has similar function and construction as those of the compensation processing unit 2 in FIG. 1, the explanation of the local motion compensation processing part 2 is omitted here.

The global motion compensation processing part 30 performs global motion compensation between the input picture s1 and the reference picture s9 taken out from the frame memory 9, and performs the local motion estimation and the motion compensation on the unit basis of a block obtained by dividing the global motion compensated picture regarded as a new reference picture. In the embodiment, at the time of the local motion estimation, the evaluation value of the motion estimation using the quantizing parameter is controlled in a manner similar to the local motion compensation processing part 2 in FIG. 2 (the details will be described hereinlater). Prediction pictures s11 and s12 generated by the local motion compensation processing part 2 and the global motion compensation processing part 30 are outputted to a GMC on/off switch 31-1, and the detected local motion vector mv is outputted to a GMC on/off switch 31-2 (GMC is the abbreviation of Global Motion Compensation). The two switches 31-1 and 31-2 are controlled by the control device 1. The control device 1 obtains GMC-on/off information by comparing the minimum evaluation value s10 of the INTER mode or the INTER4V mode sent from the local motion compensation processing part 2 to the control device 1 with the minimum evaluation value S13 sent from the global motion compensation processing part 30 to the control device 1 and by selecting the smaller one, and drives the GMC on/off switches 31-1 and 31-2 on the basis of the GMC-on/off information. When the minimum evaluation value transmitted from the global motion compensation processing part 30 is selected, an output from the global motion compensation processing part 30 is selected. When the minimum evaluation value transmitted from the local motion processing part 2 is selected, an output from the local motion compensation processing part 2 is selected. The GMC-on/off information is also outputted from the control device 1 to the coder 8.

On the basis of the evaluation result, the control device 1 controls the switches 31-1 and 31-2. A composite prediction picture is outputted from the switch 31-1 to the INTRA/INTER switch 3-1. A local motion vector mv1 of each macro block is outputted from the switch 31-2 to the coder 8. A global motion vector mv2 is outputted from the global motion compensation processing part 30 to the coder 8.

Figure 5:
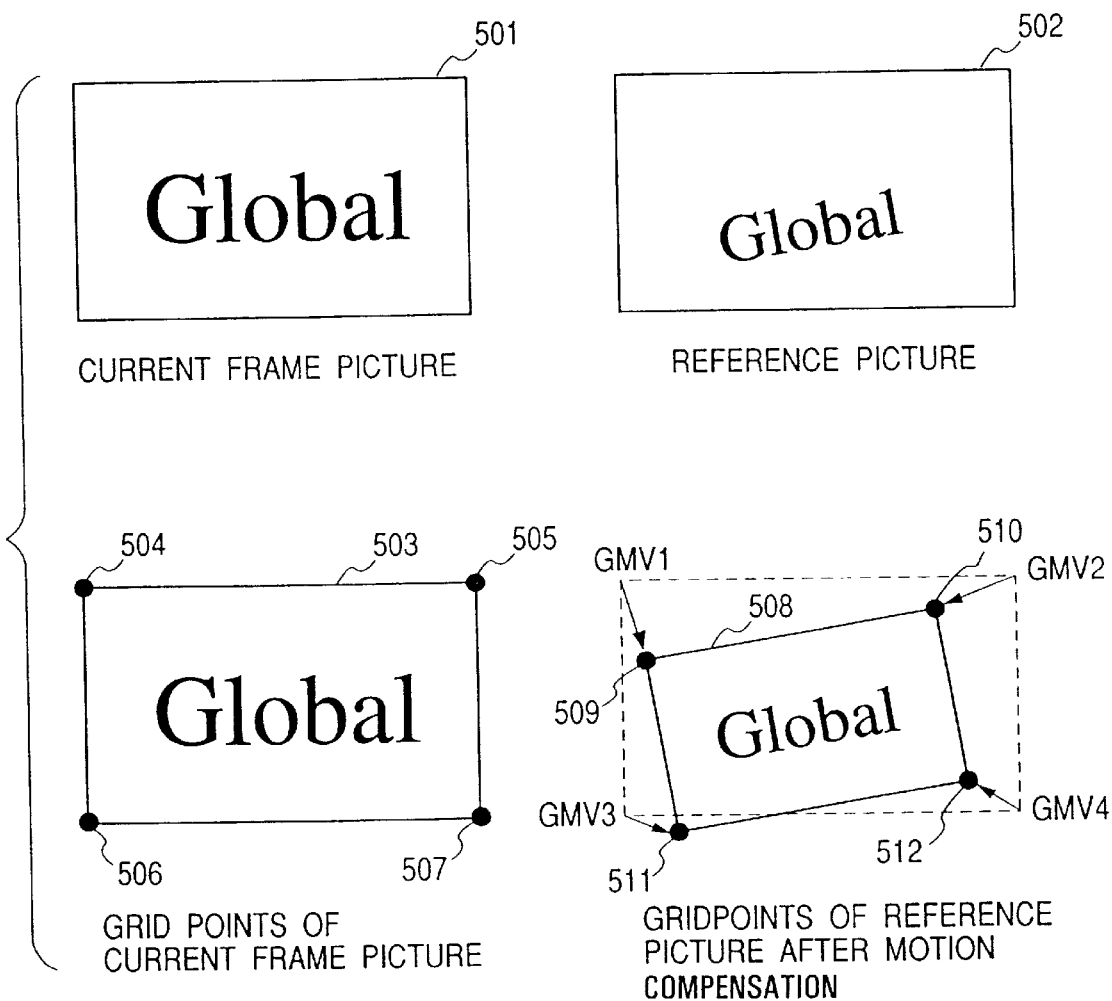
FIG. 5 is a diagram illustrating pictures for explaining the principle of a global motion compensating method.

FIG. 5 is a diagram illustrating pictures for explaining the principle of the operation of the global motion compensation processing part. Reference numeral denotes the original picture of the current frame; 502 the reference picture; 503 the patch when the whole original picture is regarded as one area (patch); and 504, 505, 506, and 507 the grid points of the patch. When the motion and transformation from the original picture to the reference picture 502 are compensated by using the patch 503, the reference picture 502 is transformed into the picture 508. By the motion compensation, the grid points 504, 505, 506, and 507 are moved to grid points 509, 510, 511, and 512, respectively. The grid points hold motion vectors GMV1, GMV2, GMV3, and GMV4 accompanying the motion amounts, respectively.

When a pixel (x, y) in the current frame picture 501 is moved from a pixel position spatially expressed by (tx(x,y), ty(x,y)) with elapse of time from the reference picture 502, a motion vector of the pixel on the global motion compensated predicted picture as a predicted picture of the current frame is expressed by (x−tx(x,y), y−ty(x,y). A spatial correspondence point (tx(x,y), ty(x,y) is obtained by using the bilinear transformation as follows.

$$tx(x,y)=b_1xy+b_2x+b_3Y+b_4$$
$$ty(x,y)=b_5xy+b_6x+b_7Y+b_8 \qquad (8)$$

The motion estimation parameters $b_1$ to $b_8$ can be unconditionally calculated from four pixels. Consequently, when the four motion vectors are coded and transferred to the decoding side, a global motion compensated predicted picture (motion compensated predicted picture formed by the global motion compensation) can be reformed commonly on the coding and decoding sides by using the expression (8).

Figure 6:
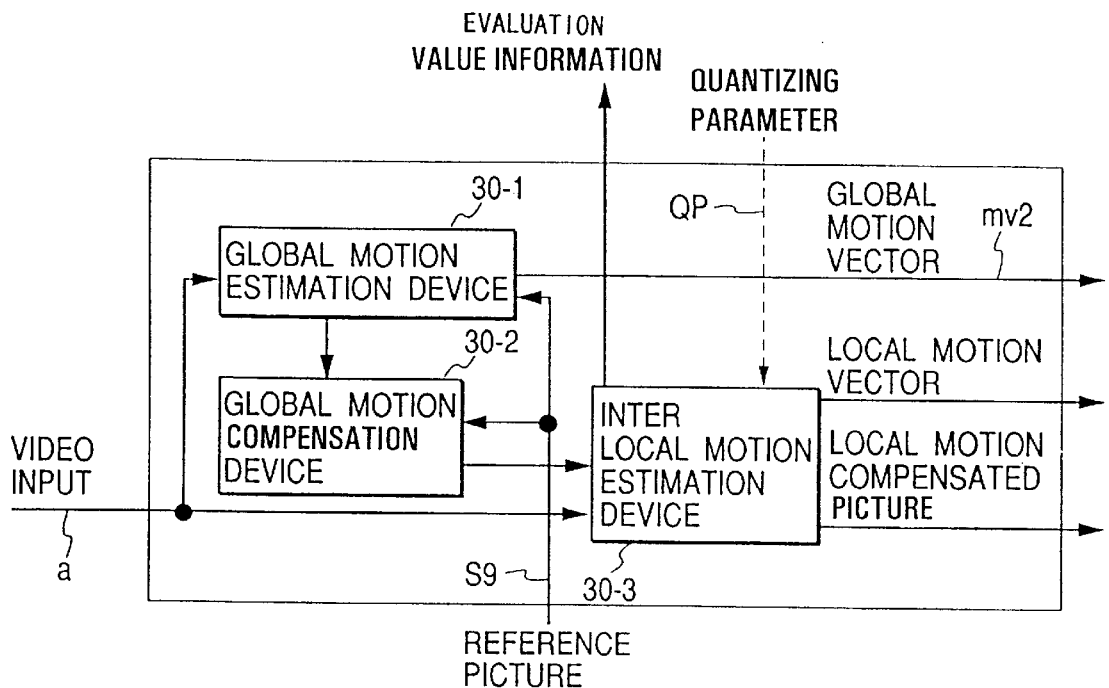
FIG. 6 is a block diagram showing the construction of a global motion compensation processing part 30 in FIG. 4.

FIG. 6 is a block diagram showing the construction of the global motion compensation processing part 30 in FIG. 4. The input picture s1 is supplied to both of a global motion estimation device 30-1 and an INTER local motion compensation device 30-3. The global motion estimation device 30-1 performs global motion estimation between the reference picture s9 taken out from the frame memory 9 and the input picture s1. The four global motion vectors GMV1, GMV2, GMV3, and GMV4 (=mv2) shown in FIG. 5 are obtained and are outputted to the coder 8. The method is not limited to specific one. For example, there is a method of predicting a vector corresponding to global motion from local motion vectors on a block unit basis and calculating the optimum value. If four motion vectors can be estimated, $b_1$ to $b_8$ in the expression (8) can be unconditionally calculated, so that the global motion compensated picture can be generated from a global motion compensation device 30-2 by using the expression (8).

The INTER local motion estimation device 30-3 performs local motion estimation in the INTER mode between the global motion compensated picture as a new reference picture and the input picture s1. When it is assumed that the input picture is divided into (a) macroblocks (1≦i≦a), the INTER local motion estimation device 30-3 peforms the following arithmetic operation to candidate local motion vectors in the search range every macroblock.

$$GE_i(u,v) = \left\{ \begin{array}{l} \sum_{x=X_i}^{X_i+15} \sum_{y=Y_i}^{Y_i+15} |F(x,y) - G(x-u, y-v)| - k, \quad (u=v=0) \\ \sum_{x=X_i}^{X_i+15} \sum_{y=Y_i}^{Y_i+15} |F(x,y) - G(x-u, y-v)| - h, \\ (u \neq 0 \text{ or } v \neq 0) \\ (x,y) \in GB_i(X_i \leq x < X_i + 16, Y_i \leq y < Y_i + 16), \\ (u,v) \in GA_i \end{array} \right. \qquad (9)$$

The local motion vector in which GEi(u,v) is minimized can be consequently detected. The marks used in the expression (9) denote as follows.

F(x,y): amplitude of the Y signal in the original picture of a frame to be coded (current frame). x and y are integers.

G(x,y): amplitude of the Y signal in the global motion compensated picture. x and y are integers.

GEi(u,v): evaluation value for a local motion vector (u,v) of the (i)th block when the picture F is divided into (a) 16×16 blocks.

GBi: pixels included in the (i)th block when the picture F is divided into (a) 16×16 blocks. Each pixel belongs to a range of Xi≦x<Xi+16 or Yi≦y<Yi+16 (x and y are integers). (Xi, Yi) shows a pixel at the left top corner of the block i.

GAi: local motion vector in the motion search range of the (i)th 16×16 block. The pixel accuracy is set to the half pixel, and each of the components u and v in the horizontal and vertical components has a real number limited to a value on a 0.5 unit basis.

The integer k is a subtracting value subtracted from the sum of absolute-value of the prediction error signals in a block when the candidate local motion vector is zero. The integer h is a difference value subtracted from the sum of absolute-value of the prediction difference signals in a block when the candidate local motion vector is not equal to zero. The two integers k and h are controlled by the quantizing parameter QP. In a manner similar to the constants n and m in the expression (5), usually, the value h should not be set larger than the value k with respect to all of the quantizing parameters QP. Generally, a control is experformed to the integer k by a quantizing parameter QP used for the integer n and to the integer h by the quantizing parameter QP used for the integer m as follows.

$$k=129+(QP-20)\times 3+h(h=129) \quad (10)$$

motion vector detected is outputted to the GMC on/off switch 31-2 and the minimum evaluation value s10 is outputted to the control device 1. The local motion compensated picture is outputted to the GMC on/off switch 31-1.

FIG. 7 is a block diagram showing the construction of another embodiment of the image coding apparatus according to the invention. In the embodiment, by using the characteristic that the local motion vector for the global motion compensated picture has a generally small value, especially, the global motion compensated picture has a lot of blocks each having a motion 0 vector, the local motion estimation to the global motion compensated picture is performed only when the candidate local motion vector is zero. The difference from the image coding apparatus of FIG. 4 is a point that the output of the local motion vector from the global motion compensation processing part 30 to the GMC on/off switch 31-2 is not added. Therefore, when the global motion compensation is turned "on" in the global motion compensation device 30-2, the local motion vector of the macroblock is not coded.

Figure 8:
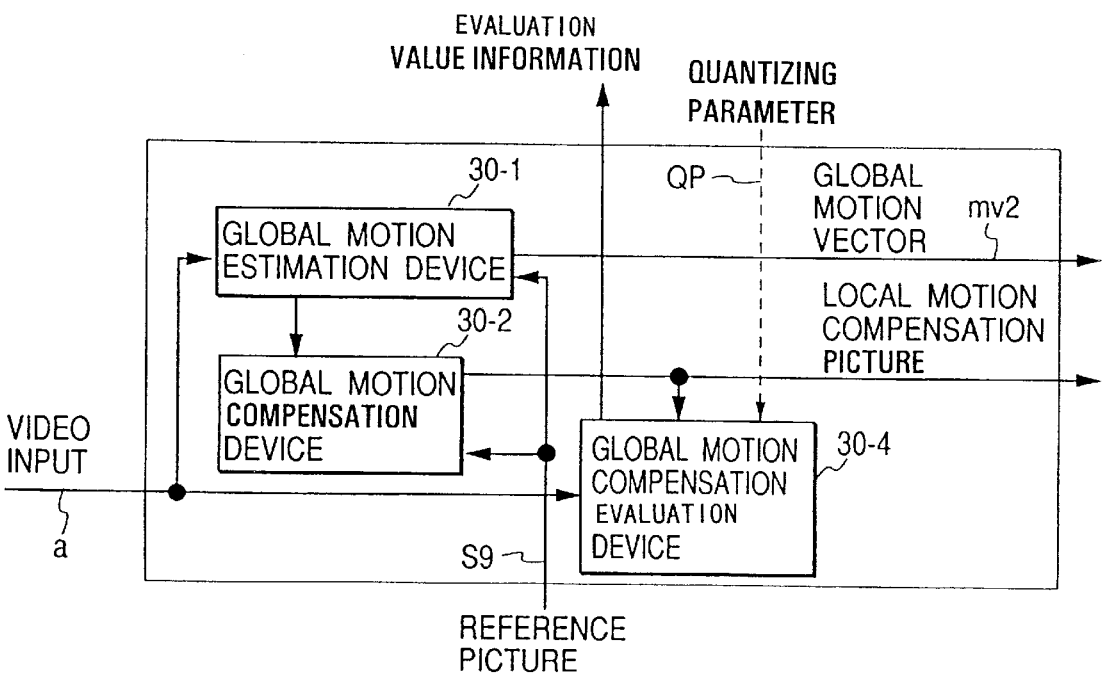
FIG. 8 is a block diagram showing the construction of a global motion compensation processing part 30 in FIG. 7.

FIG. 8 is a block diagram showing the construction of the global motion compensation processing part 30 in FIG. 7. In a manner similar to the motion compensation processing part 30 of FIG. 6, the global motion vector is detected by the global motion estimation device 30-1 and is outputted to the coder 8, and the global motion compensated picture is generated by the global motion compensation device 30-2 and is outputted to the GMC on/off switch 31-1. Subsequently, the evaluation value s13 for the motion 0 vector is calculated according to the expression (9) by a global motion compensation evaluation device 30-4 on the basis of the control of the quantizing parameter QP. The evaluation value s13 is sent to the control device 1. It is effective if the integer k in the expression (9) is set so as to be larger than the integer n set in the expression (5). It is obviously understood since it is not necessary to code the local motion vector when the global motion compensation is turned on by the GMC on/off switch 31-2. An example of effectively controlling the integer k for the integers n and m will be given as follows.

$$k=258+(QP-15)\times 3 \quad (11)$$

In this case, when QP=1, k=216. When QP=15, k=258. When QP=31, k=306. That is, when QP is larger than 15, the motion 0 vector is liable to be selected more than the case where k is fixed, and when QP is smaller than 15, the motion 0 vector is not so selected as compared with the case where k is fixed. The integer k is larger than the integer n with respect to all of QP. The motion 0 vector when the global motion compensation is "on" is selected more than the motion 0 vector when the global motion compensation is "off". Consequently, when QP is large, the amount of information of the local motion vector is effectively reduced, and when QP is small, the increase in the amount of coding information of the quantized value of the DCT coefficients accompanying the control for preferentially using a specific motion vector can be also suppressed.

Although the invention has been described by using the foregoing embodiments, the invention is not limited to the embodiments. For instance, although the H.263 coding method has been described as an example, the invention can be applied to any method using the technique of performing the motion compensation and the orthogonal transformation to the prediction error signal generated as the result of the motion compensation, and quantizing the obtained coefficients. Therefore, not only the quantizing parameter QUANT of H.263, but also the quantizing parameter MQUANT used for MPEG1 and MPEG 2 are naturally included in the quantizing parameter QP of the invention. A coding method having two or more different quantizing step width patterns can use the pattern itself or a specific quantized step width as a quantizing parameter. Further, the invention can be also applied to a video coding method including various motion predicting methods such as a coding method in which no mode requires two or more motion vectors per one macro block unlike the prediction mode INTER4V, a coding method including bidirectional prediction for performing operation of averaging pictures predicted from two directions (forward and backward directions), which is used in the standard video coding system such as MPEG1 or MPEG2, and the like. For instance, when the invention is applied to the bidirectional prediction, the invention can be applied to the forward and backward directions, respectively.

Since the principal objective of the invention is to provide two or more difference values from the fundamental evaluation function at the time of the specific motion vector estimation according to values of the quantizing parameter, the quantizing parameter is not limited to the above embodiments. Consequently, as the controlling method, in addition to the method of using the quantizing parameter as a functional variable like in the expressions (7), (9), and (10), a method of using a plurality of quantizing parameters according to cases, and the like can be also used. For example, a case in which the subtracting value from the fundamental evaluation function is set to 161, 193, 257, 321, and 387 when the quantizing parameter is from 1 to 5, from 6 to 10, from 11 to 20, from 21 to 25, and from 26 to 31, respectively, is also included in the invention. Although the fixed value "129" is used for the integer m in the expression (7) and for the integer h in the expression (9) in the embodiment, a method of controlling the integers m and h with the quantizing parameter is also included in the invention. In this case as well, it is a condition that the integers m and h are larger than 0 with respect to all of the quantizing parameters, the integer m is not larger than the integer n, and the integer h is not larger than the integer k. A difference value when the quantizing parameter is small is set so as not to be larger than a difference value when the quantizing parameter is large when the two subtracting values are compared. By controlling the integer m or h, there is an effect such that when the quantizing parameter is large, the four motion vectors required in the INTER4V mode can be reduced to one in the INTER mode. When the quantizing parameter is small, the increase in the prediction error power by limiting the motion vector to one can be reduced.

What is claimed is:

1. A video coding method of obtaining a local motion vector block by block using a block of a first kind obtained by dividing an input picture of a current frame into a plurality of blocks and a reference picture of a previous frame, quantizing transform coefficients derived by orthogonal transforming a predictive error signal between a prediction picture obtained by performing motion compensation using the reference picture and a picture of the block image of the first kind by using a quantizing parameter which is set to be smaller as the average value of a quantizing step width is narrowed, and coding the motion vector and the quantized transform coefficients, in a step of obtaining the local motion vector of the block of the first kind by a first block matching process performed between the reference picture with blocks corresponding to a plurality of candidate local motion vectors and the block of the first kind, in the case where a value obtained by subtracting a first integer from the sum of absolute-value or the sum of square-value of predictive error signals in the block is used as an evaluation value when the candidate motion vector is zero, the evaluation values for the plurality of candidate motion vectors are compared, and a candidate motion vector for which the evaluation value is the minimum is used as a local motion vector of the block, a plurality of values are used as the first integer in accordance with the value of the quantizing parameter, the first integer is controlled by the quantizing parameter in such a manner that two values as the first integer for two different quantizing parameters are set so that the value of the first integer corresponding to the smaller quantizing parameter is smaller than or equal to the value of the first integer corresponding to the larger quantizing parameter.

2. A method according to claim 1, further comprising:

a second block matching process step of dividing the block of the first kind into two or more small blocks and detecting a motion vector every small block; and a step of selecting an optimum local motion vector either the local motion vector of the block of the first kind or the local motion vectors of and the small blocks and obtaining the predicted picture;

wherein in the first block matching process, when the candidate motion vector is not zero, a value obtained by subtracting a second integer from the sum of absolute-value or the sum of square-value of predictive error signals in a block is used as an evaluation value, and in the second block matching process, the sum of absolute-value or the sum of square-value of the predictive error signals in the small block is used as an evaluation value, and a plurality of values are used as the second integer in accordance with the value of the quantizing parameter, and the second integer is controlled by the quantizing parameter by setting two values as the second integer for two different quantizing parameters so that the value of the second integer value corresponding to the smaller quantizing parameter is smaller than or equal to the value of the second integer corresponding to the larger quantizing parameter.

3. A method according to claim 1, further comprising:

a global motion compensation step of detecting a global motion vector of a whole picture using the reference picture and performing global motion compensation for synthesizing the reference picture; and a selection step of selecting either the global motion compensated picture or the local motion compensated picture block by block and synthesizing the predicted picture by using the selected blocks.

4. A method according to claim 3, further comprising:

a third block matching process step of regarding the global motion compensated picture as a second reference picture and obtaining a second local motion vector block by block using the block of the first kind and the second reference picture;

a step of obtaining a second predicted picture by performing second local motion compensation to the second reference picture or replacing the global motion compensated picture to the second predicted picture; and a step in which said selection step regards the second predicted picture as a target to be selected instead of the global motion compensated picture when the second local motion compensation is performed;

wherein in the third block matching process, in the case where a value obtained by subtracting a third integer from the sum of absolute-value or the sum of square-value of the predictive error signals in a block is used as an evaluation value when the candidate motion vector is zero, the evaluation values for a plurality of candidate motion vectors are compared, and the candidate motion vector when the evaluation value is the minimum is used as a local motion vector of the block, a plurality of values are used as the third integer value in accordance with the quantizing parameter, two values as the third integer corresponding to two different quantizing parameters are set so that the value of the third integer corresponding to the smaller quantizing parameter is smaller than or equal to the value of the third integer corresponding to the larger quantizing parameter.

5. A method according to claim 4, wherein in the third block matching process, when the candidate motion vector is not zero, a value obtained by subtracting a fourth integer from the sum of absolute-value or the sum of square-value of the predicting difference signals in a block is used as an evaluation value, a plurality of values are used as the fourth integer value in accordance with the value of the quantizing parameter, and values as the fourth integer for two different quantizing parameters are set so that the value of the fourth integer corresponding to the smaller quantizing parameter is smaller than or equal to the value of the fourth integer corresponding to the larger parameter.

6. A method according to claim 3, further comprising:

a second block matching process step of dividing the block of the first kind into two or more small blocks and detecting a motion vector every small block; and a step of selecting an optimum local motion vector either local motion vector of the block of the first kind or the local motion vectors of the small blocks and obtaining the predicting picture;

wherein in the first block matching process, when the candidate motion vector is not zero, a value obtained by subtracting the second integer from the sum of absolute-value or the sum of square-value of predicting difference signals in a block is used as an evaluation value, and in the second block matching process, the sum of absolute-value or the sum of square-value of the predictive error signals in the small block is used as an evaluation value, and a plurality of values are used as the second integer in accordance with the value of the quantizing parameter, and two values as the second integer for two different quantizing parameters are set so that the value of the second integer corresponding to the smaller quantizing parameter is smaller than or equal to the value of the second integer corresponding to the larger quantizing parameter.

7. An image signal coding apparatus comprising:

a local motion compensation processing part for dividing a picture frame into a plurality of blocks, obtaining a local motion vector of the divided block from a first reference picture, and synthesizing a motion compensated predicting picture by using the local motion vector;

a quantizer for orthogonal transforming a predictive error signal between the picture of the block and the predicting picture and quantizing transform coefficients obtained by the orthogonal transformation;

a control part for generating at least a quantizing parameter controlling the quantizing characteristic of the quantizer so that the smaller the transform coefficient is, the smaller the average value of a quantizing step width is; and a coder for coding the motion vector and an output of the quantizer;

wherein the local motion compensation processing part includes:

a converting part for converting the quantizing parameter into a first integer; and a first local motion estimation part for using a value obtained by subtracting the sum of absolute-value or the sum of square-value of predicting difference signals in a block is used as an evaluation value when the motion candidate vector is zero, and a plurality of values are used as a first integer in accordance with the value of the quantizing parameter, and two values as the first integer for two different quantizing parameters are set so that the value of the first integer corresponding to the smaller quantizing parameter is smaller than or equal to the value of the first integer corresponding to the larger quantizing parameter.

8. An apparatus according to claim 7, wherein the local motion compensation processing part further includes a second local motion estimation part for obtaining a motion vector of each small block obtained by dividing the block into a plurality of small blocks, the second local motion estimation part uses the sum of absolute-value or the sum of square-value of the predictive error signals in each small block as an evaluation value, the first local motion estimation part includes a converting part for converting the quantizing parameter into a second integer when a motion candidate vector is not zero and uses a value obtained by subtracting the second integer from the sum of absolute-value or the sum of square-value of the predictive error signals in the block as an evaluation value when the motion candidate vector is not zero, a plurality of values are used as the second integer in accordance with the value of the quantizing parameter, and two values as the second integer for two different quantizing parameters are set so that the value of the second integer corresponding to the smaller quantizing parameter is smaller than or equal to the value of the second integer corresponding to the larger quantizing parameter.

9. An apparatus according to claim 7, further comprising:

a global motion compensation processing part for estimating global motion of a current picture from the first reference picture and performing generation of a global motion vector and global motion compensation when the global motion can be detected;

first selection means for selecting either a picture which is motion compensated by the local motion compensation processing part and a picture which is motion compensated by the global motion compensation processing part and using the selected picture as the predicting picture; and second selection means for outputting a motion vector of the local motion compensation processing part to the coder when the picture motion which is compensated by the local motion compensation processing part is selected.

10. An apparatus according to claim 9, wherein the global motion compensation processing part includes a third local motion estimation apparatus which uses an output of the global motion compensation processing part as a second reference picture, divides the second reference picture into blocks, and obtains a local motion vector of each block and a local motion compensated picture, and the third local motion estimation device uses a value obtained by subtracting a third integer controlled by the quantizing parameter from the sum of absolute-value or the sum of square-value of the predictive error signals in a block as a reference value for obtaining the local motion vector of each block when the candidate motion vector is zero, and two values as the third integer corresponding to two different quantizing parameters are set so that the value of the third integer corresponding to the smaller quantizing parameter is smaller than or equal to the value of the third integer corresponding to the larger quantizing parameter.

11. An apparatus according to claim 10, wherein the third local motion estimation device uses a value obtained by subtracting a fourth integer controlled by the quantizing parameter from the sum of absolute-value or the sum of square-value of the predictive error signals in the block as a reference value for obtaining a local motion vector of each block when the candidate motion vector is not zero, and two values as the fourth integer corresponding to two different quantizing parameters are set so that the value of the fourth integer corresponding to the smaller quantizing parameter is smaller than or equal to the value of the fourth integer corresponding to the larger quantizing parameter.

12. An apparatus according to claim 8, further comprising:

a global motion compensation processing part for estimating global motion of a current picture from the first reference picture and performing generation of a global motion vector and global motion compensation when the global motion can be detected;

first selection means for selecting either a picture which is motion compensated by the local motion compensation processing part or a picture which is motion compensated by the global motion compensation processing part and using the selected picture as the predicting picture; and second selection means for outputting a motion vector of the local motion processing part to the coder when the picture which is motion compensated by the local motion compensation processing part is selected;

wherein the global motion compensation processing part includes a third local motion estimation device which uses an output of the global motion compensation processing part as a second reference picture, divides the second reference picture into blocks, and obtains a local motion vector of each block and a local motion compensated picture, the third local motion estimation device uses a value obtained by subtracting the third integer controlled by the quantizing parameter from the sum of absolute-value or the sum of square-value of the predictive error signals in the block as the reference value for obtaining the local motion vector of each block when the candidate motion vector is zero, and two values as the third integer corresponding to two different quantizing parameters are set so that the value of the third integer corresponding to the smaller quantizing parameter is smaller than or equal to the value of the third integer corresponding to the larger quantizing parameter.

13. The apparatus according to claim 12, wherein the third local motion estimation device uses a value obtained by subtracting a fourth integer controlled by the quantizing parameter from the sum of absolute-value or the sum of square-value of the predictive error signals in the block as the reference value for obtaining the local motion vector of each block when the candidate motion vector is not zero, and two values as the fourth integer corresponding to two different quantizing parameters are set so that the value of the fourth integer corresponding to the smaller quantizing parameter is smaller than or equal to the value of the fourth value corresponding to the larger quantizing parameter.

14. A method according to claim 1, further comprising:

a global motion compensation step of detecting a global motion vector of a whole picture using the reference picture and performing global motion compensation for synthesizing the reference picture; and a selection step of selecting either the global motion compensated picture or the local motion compensated picture block by block and synthesizing the predicted picture by using the selected blocks;

wherein in the selection step, a value obtained by subtracting an integer from the sum of absolute-value or the sum of square-value of the predicted error signals in a block is used as the evaluation value, when the block is derived from the global motion compensated picture, a plurality of values are used as the integer in accordance with the value of the quantizing parameter, and the integer is controlled by the quantizing parameter by setting two values as the integer for two different quantizing parameters so that the value of the integer corresponding to the smaller quantizing parameter is smaller than or equal to the value of the integer corresponding to the larger quantizing parameter.

15. An apparatus according to claim 7, further comprising:

a global motion compensation part for estimating global motion of a current picture from the first reference picture and performing generation of a global motion vector and global motion compensation when the global motion can be detected;

first selection means for selecting either a picture which is motion compensated by the local motion compensation processing part or a picture which is motion compensated by the global motion compensation processing part block by block and using the selected block as the predicting picture; and second selection means for outputting a motion vector of the local motion compensation processing part to the coder when the block which is compensated by the local motion compensation processing part is selected;

wherein in the first selection means, a value obtained by subtracting an integer from the sum of absolute-value or the sum of square-value of the predicted error signals in a block is used as the evaluation value, when the block is derived from the picture which is compensated by the global motion compensation process part, a plurality of values are used as the integer in accordance with the value of the quantizing parameter, and the integer is controlled by the quantizing parameter by setting two values as the integer for two different quantizing parameters so that the value of the integer corresponding to the smaller quantizing parameter is smaller than or equal to the value of the integer corresponding to the larger quantizing parameter.

16. An apparatus according to claim 7, further comprising:

a global motion compensation processing part for estimating global motion of a current picture from the first reference picture and performing generation of a global motion vector and global motion compensation when the global motion can be detected;

first selection means for selecting either a picture which is motion compensated by the local motion compensation processing part or a picture which is motion compensated by the global motion compensation processing part block by block and using the selected block as the predicting picture; and second selection means for outputting a motion vector of the local motion processing part to the coder when the block which is motion compensated by the local motion compensation processing part is selected;

wherein the global motion compensation processing part includes a third local motion estimation device which uses an output of the global motion compensation processing part as a second reference picture, divides the second reference picture into blocks, and obtains a local motion vector of each block and a local motion compensated picture, the third local motion estimation device uses a value obtained by subtracting the third integer controlled by the quantizing parameter from the sum of absolute-value or the sum of square-value of the predictive error signals in the block as the reference value for obtaining the local motion vector of each block when the candidate motion vector is zero, and two values as the third integer corresponding to two different quantizing parameters are set so that the value of the third integer corresponding to the smaller quantizing parameter is smaller than or equal to value of the third integer corresponding to the larger quantizing parameter.

* * * * *